(12) United States Patent
Shao et al.

(10) Patent No.: US 12,366,776 B2
(45) Date of Patent: Jul. 22, 2025

(54) DISPLAY SUBSTRATE AND MANUFACTURING METHOD THEREFOR, AND DISPLAY DEVICE

(71) Applicants: HEFEI XINSHENG OPTOELECTRONICS TECHNOLOGY CO., LTD., Anhui (CN); BOE TECHNOLOGY GROUP CO., LTD., Beijing (CN)

(72) Inventors: Xibin Shao, Beijing (CN); Yongcan Wang, Beijing (CN); Zhangtao Wang, Beijing (CN); Rui Ma, Beijing (CN); Xianjie Shao, Beijing (CN); Yanchun Lu, Beijing (CN); Shuishui Zhang, Beijing (CN); Li Yin, Beijing (CN); Min Zhong, Beijing (CN)

(73) Assignees: HEFEI XINSHENG OPTOELECTRONICS TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 121 days.

(21) Appl. No.: 17/763,125

(22) PCT Filed: Apr. 12, 2021

(86) PCT No.: PCT/CN2021/086492
§ 371 (c)(1),
(2) Date: Mar. 23, 2022

(87) PCT Pub. No.: WO2021/227735
PCT Pub. Date: Nov. 18, 2021

(65) Prior Publication Data
US 2022/0342248 A1    Oct. 27, 2022

(30) Foreign Application Priority Data

May 12, 2020   (CN) .......................... 202010399023.X

(51) Int. Cl.
*G02F 1/1339*   (2006.01)
*G02F 1/1335*   (2006.01)

(52) U.S. Cl.
CPC .... *G02F 1/13394* (2013.01); *G02F 1/133512* (2013.01); *G02F 1/133516* (2013.01); *G02F 1/13396* (2021.01)

(58) Field of Classification Search
CPC .................................................. G02F 1/13394
See application file for complete search history.

(56) References Cited

U.S. PATENT DOCUMENTS

| 9,442,326 B2 * | 9/2016 | Oono .................. G02F 1/13394 |
| 2013/0135569 A1 * | 5/2013 | Nagami .............. G02F 1/13394 349/153 |

(Continued)

FOREIGN PATENT DOCUMENTS

| CN | 201440193 U | 4/2010 |
| CN | 101802695 A | 8/2010 |

(Continued)

OTHER PUBLICATIONS

Office Action issued on Oct. 25, 2024, in corresponding Chinese patent Application No. 202010399023.X, 17 pages.

*Primary Examiner* — Edmond C Lau
(74) *Attorney, Agent, or Firm* — XSENSUS LLP

(57) ABSTRACT

A display substrate has a display area and an encapsulation area around the display area. The display substrate includes a substrate and a spacer layer. The spacer layer is located on a side of the substrate, and includes a plurality of first columnar spacers located in the encapsulation area and distributed at intervals around the display area, and bottom ends of the plurality of first columnar spacers are fixedly disposed on the substrate. Ends of the plurality of first columnar spacers proximate to the substrate are the bottom (Continued)

ends thereof, and ends of the plurality of first columnar spacers away from the substrate are top ends thereof.

10 Claims, 14 Drawing Sheets

(56) References Cited

U.S. PATENT DOCUMENTS

| | | | |
|---|---|---|---|
| 2014/0055728 A1* | 2/2014 | Oono | ............... G02F 1/13394 349/138 |
| 2014/0300848 A1 | 10/2014 | Mori | |
| 2021/0033907 A1 | 2/2021 | Yin | |

FOREIGN PATENT DOCUMENTS

| | | | |
|---|---|---|---|
| CN | 103969883 | A | 8/2014 |
| CN | 104730756 | A | 6/2015 |
| CN | 105489124 | A | 4/2016 |
| CN | 105824153 | A | 8/2016 |
| CN | 107942579 | A | 4/2018 |
| CN | 109188789 | A | 1/2019 |
| CN | 110456577 | A | 11/2019 |
| CN | 110488529 | A | 11/2019 |
| CN | 110850629 | A | 2/2020 |
| CN | 111427198 | A | 7/2020 |
| CN | 211741793 | U | 10/2020 |

* cited by examiner

DISPLAY SUBSTRATE AND MANUFACTURING METHOD THEREFOR, AND DISPLAY DEVICE

CROSS-REFERENCE TO RELATED APPLICATIONS

The present application is a national phase entry under 35 USC 371 of International Patent Application No. PCT/CN2021/086492 filed on Apr. 12, 2021, which claims priority to Chinese Patent Application No. 202010399023.X, filed on May 12, 2020, which are incorporated herein by reference in their entirety.

TECHNICAL FIELD

The present disclosure relates to the field of display technologies, and in particular, to a display substrate and a manufacturing method therefor, and a display device.

BACKGROUND

With the development of display technologies, since flat display devices such as liquid crystal displays (LCDs) have advantages of clear image quality, low power consumption, thin body, wide application range and the like, they have been widely used in various products requiring display functions such as mobile phones, televisions, personal digital assistants, digital cameras, notebook computers and desktop computers, and have become a mainstream of current display devices.

SUMMARY

In an aspect, a display substrate is provided. The display substrate has a display area and an encapsulation area around the display area. The display substrate includes a substrate and a spacer layer.

The spacer layer is located on a side of the substrate, and the spacer layer includes a plurality of first columnar spacers located in the encapsulation area and distributed at intervals around the display area. Bottom ends of the plurality of first columnar spacers are fixedly disposed on the substrate. Ends of the plurality of first columnar spacers proximate to the substrate are the bottom ends thereof, and ends of the plurality of first columnar spacers away from the substrate are top ends thereof.

In some embodiments, distances from the top ends of the plurality of first columnar spacers to a surface of the substrate away from the plurality of first columnar spacers are approximately equal.

In some embodiments, distances from the bottom ends of the plurality of first columnar spacers to a surface of the substrate away from the plurality of first columnar spacers are approximately equal, and heights of the plurality of first columnar spacers are approximately equal.

In some embodiments, the spacer layer further includes a plurality of second columnar spacers located in the display area and distributed at intervals, and bottom ends of the plurality of second columnar spacers are fixedly disposed on the substrate. Ends of the plurality of second columnar spacers proximate to the substrate are the bottom ends thereof, and ends of the plurality of second columnar spacers away from the substrate are top ends thereof.

In some embodiments, distances from the top ends of the plurality of first columnar spacers to a surface of the substrate away from the plurality of first columnar spacers are approximately equal to distances from the top ends of the plurality of second columnar spacers to the surface of the substrate away from the plurality of second columnar spacers. Alternatively, distances from the bottom ends of the plurality of second columnar spacers to a surface of the substrate away from the plurality of second columnar spacers are approximately equal to distances from the bottom ends of the plurality of first columnar spacers to the surface of the substrate away from the plurality of first columnar spacers, and/or heights of the plurality of first columnar spacers are approximately equal to heights of the plurality of second columnar spacers.

In some embodiments, the display substrate further includes a filter layer and a supporting layer.

The filter layer is located between the plurality of second columnar spacers and the substrate, and the filter layer includes a plurality of filter patterns with different colors.

The supporting layer is located between the plurality of first columnar spacers and the substrate, and the supporting layer includes at least one supporting pattern with at least one color. A material of a supporting pattern with any color of the at least one color is the same as a material of any filter pattern in the plurality of filter patterns with different colors.

In some embodiments, the supporting layer has a plurality of hollowed-out regions and includes a plurality of supporting patterns. Thicknesses of the plurality of supporting patterns are approximately equal to a thickness of the filter pattern.

In some embodiments, colors of the plurality of supporting patterns are the same.

In some embodiments, the supporting layer has no hollowed-out region, and a thickness of the supporting layer is less than a thickness of the filter pattern.

In some embodiments, the display substrate further includes a black matrix layer located on the substrate. Projections of the plurality of first columnar spacers on the substrate and projections of the plurality of second columnar spacers on the substrate are all located within a projection of the black matrix layer on the substrate.

In some embodiments, a material of the plurality of first columnar spacers is the same as a material of the plurality of second columnar spacers.

In some embodiments, distances from the bottom ends of the plurality of first columnar spacers to a surface of the substrate away from the plurality of first columnar spacers are not equal, and heights of the plurality of first columnar spacers are not equal.

In another aspect, a display device is provided. The display device includes the display substrate as described in any of the above embodiments.

In yet another aspect, a manufacturing method for a display substrate is provided. The display substrate has a display area and an encapsulation area around the display area. The manufacturing method for the display substrate includes: forming a first film on a substrate, and patterning the first film to form a plurality of first columnar spacers distributed at intervals. The plurality of first columnar spacers are located in the encapsulation area.

In some embodiments, a plurality of second columnar spacers distributed at intervals are synchronously formed when the first film is patterned to form the plurality of first columnar spacers. The plurality of second columnar spacers are located in the display area. Distances from bottom ends of the plurality of second columnar spacers to a surface of the substrate away from the plurality of second columnar spacers are approximately equal to distances from bottom ends of the plurality of first columnar spacers to the surface of the substrate away from the plurality of first columnar spacers, and/or heights of the plurality of first columnar spacers are approximately equal to heights of the plurality of second columnar spacers. Ends of the plurality of first columnar spacers proximate to the substrate are the bottom ends thereof, and ends of the plurality of second columnar spacers proximate to the substrate are the bottom ends thereof.

In some embodiments, a plurality of second columnar spacers distributed at intervals are synchronously formed when the first film is patterned to form the plurality of first columnar spacers. The plurality of second columnar spacers are located in the display area. Distances from top ends of the plurality of first columnar spacers to a surface of the substrate away from the plurality of first columnar spacers are approximately equal to distances from top ends of the plurality of second columnar spacers to the surface of the substrate away from the plurality of second columnar spacers. Ends of the plurality of first columnar spacers away from the substrate are the top ends thereof, and ends of the plurality of second columnar spacers away from the substrate are the top ends thereof.

In some embodiments, before forming the first film, the manufacturing method for the display substrate further includes: forming a second film on a side of the substrate, and patterning the second film to form a filter layer and a supporting layer. The filter layer includes filter patterns with a plurality of colors. The supporting layer includes at least one supporting pattern with at least one color, and a material of a supporting pattern with any color of the at least one color is the same as a material of any filter pattern in filter patterns with different colors.

In some embodiments, when the second film is patterned to form the filter layer and the supporting layer, the formed supporting layer has a plurality of hollowed-out regions.

In some embodiments, the formed supporting layer includes a plurality of supporting patterns, and thicknesses of the plurality of supporting patterns are approximately equal to a thickness of the filter pattern.

In some embodiments, colors of the plurality of supporting patterns included in the formed supporting layer are the same.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art can obtain other drawings according to these drawings. In addition, the accompanying drawings in the following description may be regarded as schematic diagrams, and are not limitations on actual sizes of products, actual processes of methods and actual timings of signals involved in the embodiments of the present disclosure.

DETAILED DESCRIPTION

Figure 1:
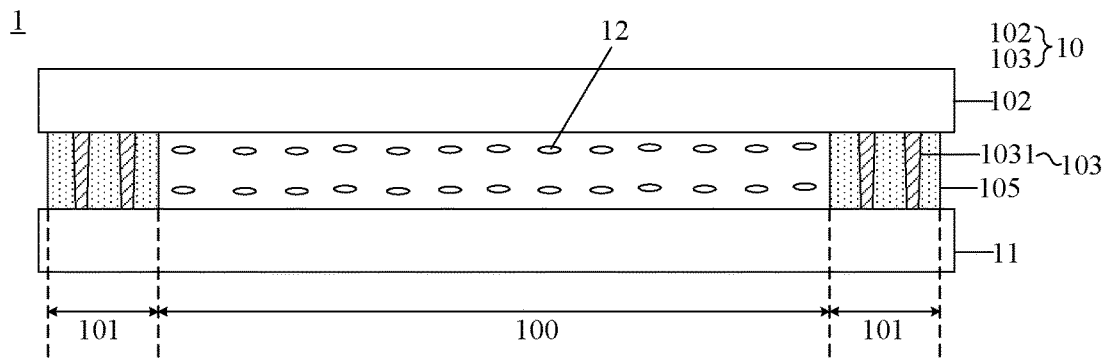
FIG. 1 is a structural diagram of a display panel, in accordance with some embodiments of the present disclosure.

Technical solutions in some embodiments of the present disclosure will be described clearly and completely with reference to the accompanying drawings below. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed in an open, inclusive meaning, i.e., "including, but not limited to". In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms such as "first" and "second" are used for descriptive purposes only and are not to be construed as indicating or implying relative importance or implicitly indicating the number of indicated technical features. Thus, a feature defined with the term "first" or "second" may explicitly or implicitly includes one or more of the features. In the description of the embodiments of the present disclosure, the term "a plurality of/the plurality of" means two or more unless otherwise specified.

The phrase "at least one of A, B and C" has the same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

As used herein, the term "if" is, optionally, construed to mean "when" or "upon" or "in response to determining" or "in response to detecting", depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]", depending on the context.

The use of the phrase "applicable to" or "configured to" herein means an open and inclusive expression, which does not exclude devices that are applicable to or configured to perform additional tasks or steps.

Additionally, the use of "based on" is meant to be open and inclusive, in that a process, step, calculation, or other action "based on" one or more recited conditions or values may, in practice, be based on additional conditions or value beyond those recited.

As used herein, "about" or "approximately" includes a stated value and an average value within an acceptable range of deviation of a particular value. The acceptable range of deviation is determined by a person of ordinary skill in the art in view of the measurement in question and the error associated with the measurement of a particular quantity (i.e., the limitations of the measurement system).

Exemplary embodiments are described herein with reference to sectional views and/or plan views as idealized exemplary drawings. In the drawings, thicknesses of layers and sizes of regions are enlarged for clarity. Thus, variations in shape relative to the accompanying drawings due to, for example, manufacturing technologies and/or tolerances may be envisaged. Exemplary embodiments should not be construed as being limited to the shapes of the regions shown herein, but including shape deviations due to, for example, manufacturing. For example, an etched region that is shown in a rectangular shape generally has a curved feature. Therefore, the regions shown in the accompanying drawings are schematic in nature, and their shapes are not intended to show actual shapes of regions in a device, and are not intended to limit the scope of the exemplary embodiments.

Embodiments of the present disclosure provide a display device, which may be, for example, a display panel or a combination of a display panel and a backlight. For example, the display panel is a liquid crystal display panel, and the backlight is a direct-lit backlight or an edge-lit backlight.

As shown in FIG. 1, the display panel 1 has a display area 100 and an encapsulation area 101 around the display area. For example, the display panel 1 includes a display substrate 10 and an opposite substrate 11 that are arranged opposite to each other, and a liquid crystal layer 12 located between the display substrate 10 and the opposite substrate 11.

The display substrate 10 includes first columnar spacers 1031 provided in the encapsulation area 101. The first columnar spacers 1031 are used to keep a cell gap of the liquid crystal layer 12.

A sealant 105 is further provided between the display substrate 10 and the opposite substrate 11. The sealant 105 is located in the encapsulation area 101 and is used to encapsulate liquid crystal molecules in the liquid crystal layer 12 between the display substrate 10 and the opposite substrate 11.

In some embodiments, as shown in FIGS. 1, 2A to 2G, the display substrate 10 also has the display area 100 and the encapsulation area 101 around the display area 100.

In some embodiments, the display area 100 is, for example, a rectangular area, and the encapsulation area 101 is disposed around the display area 100, for example, the encapsulation area 101 is a square-shaped area. The word "around" means being around something for a circle.

Figure 2A:
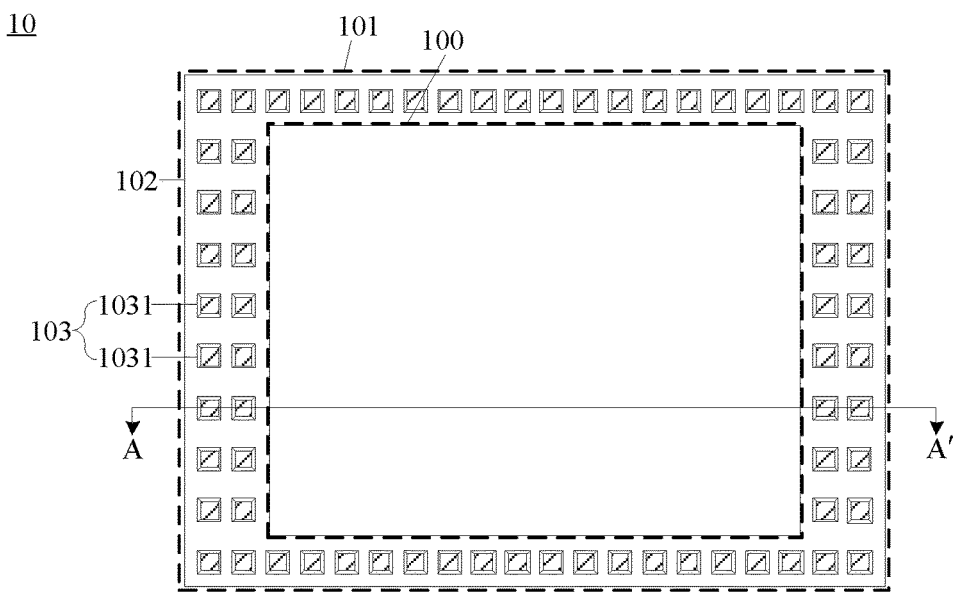
FIG. 2A is a structural diagram of a display substrate, in accordance with some embodiments of the present disclosure.
Figure 2B:
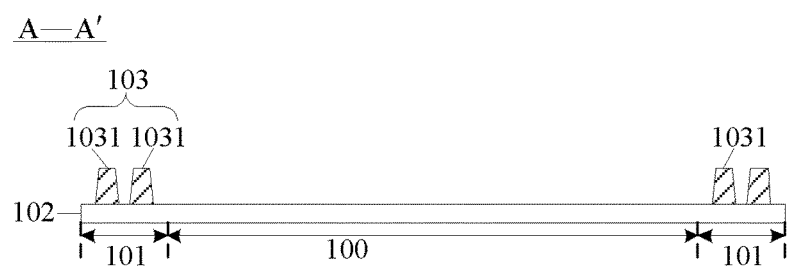
FIGS. 2B to 2E are sectional views of the display substrate in FIG. 2A taken along the line A-A'.
Figure 2C:
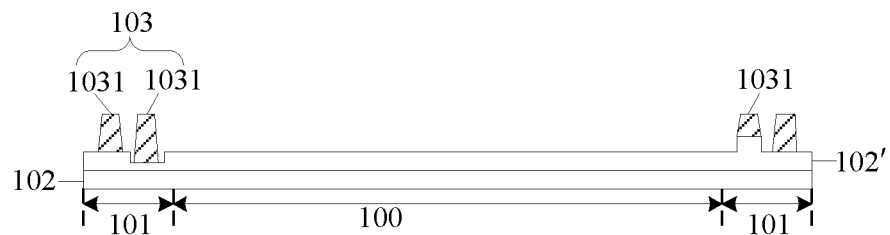
Figure 2D:
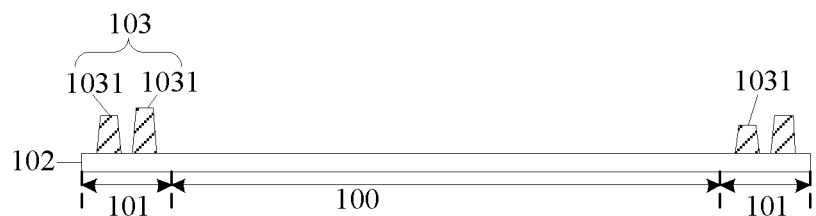
Figure 2E:
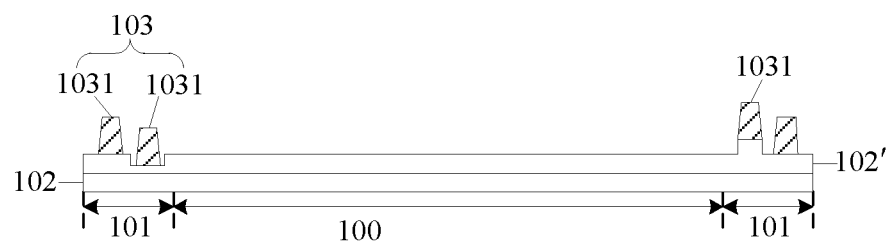
Figure 2F:
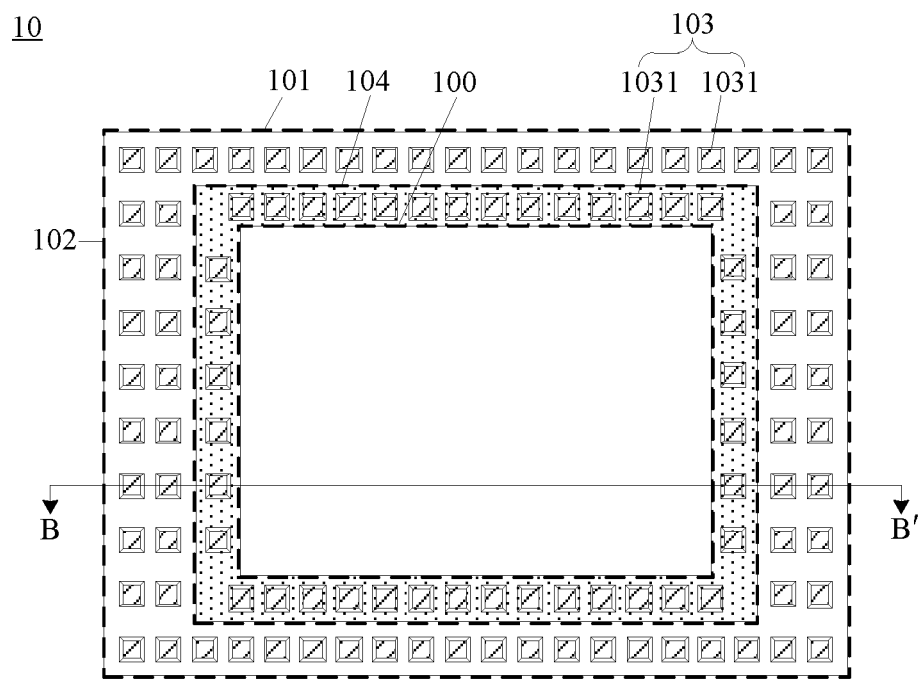
FIG. 2F is a structural diagram of another display substrate, in accordance with some embodiments of the present disclosure.
Figure 2G:
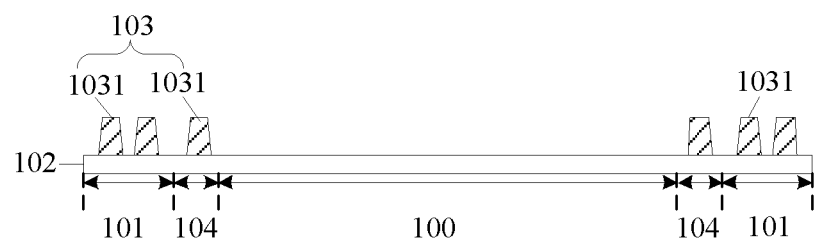
FIG. 2G is a sectional view of the display substrate in FIG. 2F taken along the line B-B'.

In some other embodiments, as shown in FIGS. 2F to 2G, the display panel 1 has the display area 100, a dummy pixel area 104 around the display area 100, and the encapsulation area 101 around the dummy pixel area 104. The display area 100 is, for example, a rectangular area, and the dummy pixel area 104 and the encapsulation area 101 are both, for example, square-shaped areas. In this case, the encapsulation area 101 is still around the display area 100.

As shown in FIGS. 1, 2A to 2G, the display substrate 10 includes a substrate 102 and a spacer layer 103.

The substrate 102 is, for example, a glass substrate 102.

The spacer layer 103 located on a side of the substrate 102, and the spacer layer 103 includes a plurality of first columnar spacers 1031 located in the encapsulation area 101 and distributed at intervals around the display area 100. Bottom ends of the plurality of first columnar spacers 1031 are fixedly disposed on the substrate 102. Ends of the plurality of first columnar spacers 1031 proximate to the substrate 102 are the bottom ends thereof, and ends of the plurality of first columnar spacers 1031 away from the substrate 102 are top ends thereof.

The spacer layer 103 includes first columnar spacers 1031 located in the encapsulation area 101 and distributed at intervals around the display area 100, which includes, for example, a case as shown in FIGS. 2A to 2E where the encapsulation area 101 and the display area 100 are next to each other and a case as shown in FIGS. 2F and 2G where the encapsulation area 101 is around the dummy pixel area 104 and the dummy pixel area 104 is around the display area 100. That is, it is not limited in the embodiments of the present disclosure that the encapsulation area 101 and the display area 100 must be next to each other.

For example, a shape of a structure of the first columnar spacer 1031 is a frustum of a cone or a frustum of a prism. A shape of an upper surface and a lower surface of the frustum of the cone may be circular or elliptical, and a shape of an upper surface and a lower surface of the frustum of the prism may be rectangular. In a case where the structure of the first columnar spacer 1031 is a frustum of a cone or a frustum of a prism, a shape of a longitudinal section of the first columnar spacer 1031 is a trapezoid, and a length of a bottom base of the trapezoid is greater than a length of a top base of the trapezoid, and the bottom base of the trapezoid is located on a side proximate to the substrate 102.

It will be understood by a person skilled in the art that, the bottom ends of the plurality of first columnar spacers 1031 being fixedly disposed on the substrate 102 may be a case that the plurality of first columnar spacers 1031 are not directly manufactured on the substrate 102, but are manufactured on a pattern layer on the substrate 102. That is, the bottom ends of the plurality of first columnar spacers 1031 are fixedly disposed on the substrate on which the pattern layer has been manufactured. The pattern layer includes at least one film layer, and a specific structure of the pattern layer is related to a specific structure of the display substrate 10. For example, in a case where the display substrate 10 is an array substrate, the pattern layer may include a thin film transistor layer, a pixel electrode layer, an insulating layer, a common electrode layer and the like; and in a case where the display substrate 10 is a color filter substrate, the pattern layer may include a black matrix layer, a filter layer and the like. However, since a surface of the pattern layer away from the substrate 102 is not necessarily a horizontal plane, there may be a certain difference in distances between the bottom ends of the first columnar spacers 1031 and the substrate 102 and in heights of the first columnar spacers 1031.

For example, referring to FIGS. 2C and 2E, in a case where there are some recessed regions and raised regions on the surface of the pattern layer 102' away from the substrate 102, the top ends of the plurality of first columnar spacers 1031 are flush or approximately flush in FIG. 2C, and the heights of the plurality of first columnar spacers 1031 are equal or approximately equal in FIG. 2E.

In a case where there are not any recessed regions and raised regions on the surface of the pattern layer 102' away from the substrate 102, that is, in a case where the surface of the pattern layer 102' away from the substrate 102 is a horizontal plane, for example, referring to FIGS. 2B, 2D and 2G, the distances between the bottom ends of the plurality of first columnar spacers 1031 and the substrate 102 are equal or approximately equal.

It will be noted that, the surface of the pattern layer 102' away from the substrate 102 is a horizontal plane, and the distances between the bottom ends of the plurality of first columnar spacers 1031 and the substrate 102 are equal or approximately equal. Thus, in order to simplify the structural diagram of the display substrate 10, the pattern layer 102' is not shown in FIGS. 2B, 2D and 2G. However, it will be understood by a person skilled in the art that the bottom ends of the first columnar spacers 1031 in these structures are located on the pattern layer 102', and the surface of the pattern layer 102' away from the substrate 102 is a horizontal plane.

The first columnar spacers 1031 are manufactured on the substrate 102 on which the pattern layer 102' has been manufactured, and the bottom ends of the first columnar spacers 1031 are fixedly disposed on the substrate 102 on which the pattern layer 102' has been manufactured. The heights of the first columnar spacers 1031, the distances between the bottom ends of the first columnar spacers 1031 and the substrate 102, and distances between the top ends of the first columnar spacers 1031 and the substrate 102 may all be designed according to design requirements of the display substrate 10; and positions of the first columnar spacers 1031 do not change due to an external force applied to the display substrate 10, and distribution of the first columnar spacers 1031 is not random. Therefore, a distance between the display substrate 10 and the opposite substrate 11 may be controlled more accurately.

Figure 3A:
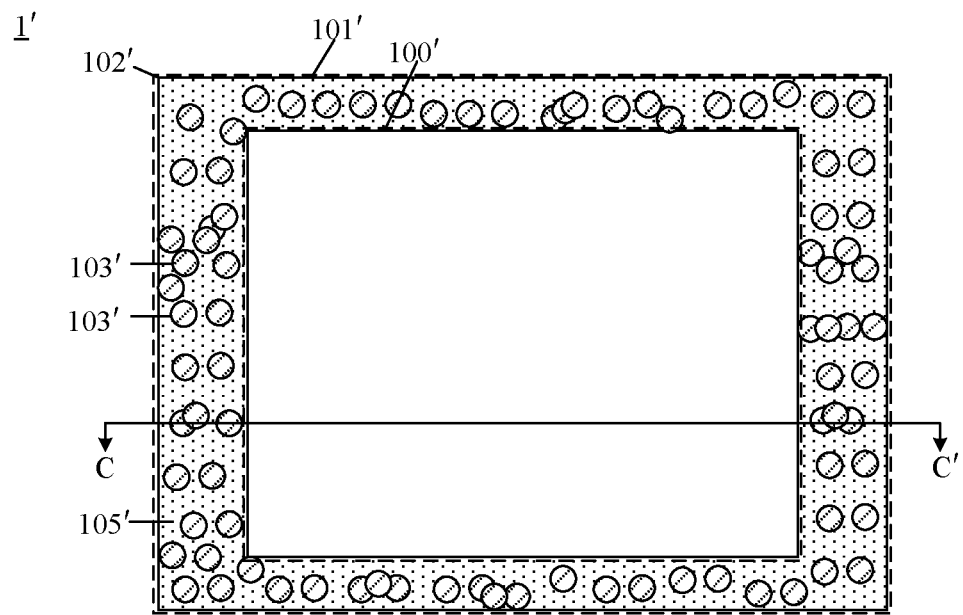
FIG. 3A is a structural diagram of a display substrate in the related art.
Figure 3B:
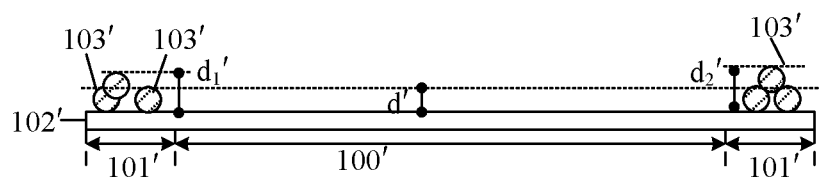
FIG. 3B is a sectional view of the display substrate in FIG. 3A taken along the line C-C'.
Figure 3C:
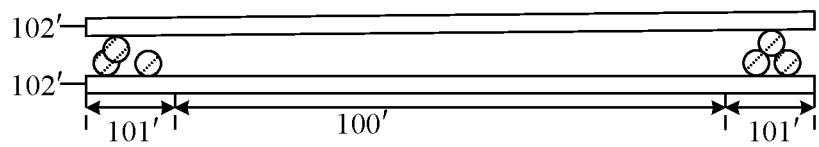
FIG. 3C is a display panel in the related art.

Referring to FIGS. 3A and 3B, the display panel 1' in the related art includes a color filter substrate and an array substrate that are arranged opposite to each other. A liquid crystal layer, a sealant 105' for sealing the liquid crystal layer, and plastic balls located in the sealant 105' and used for supporting the color filter substrate and the array substrate are all provided between the color filter substrate and the array substrate. The display panel 1' further has a display area 100' and an encapsulation area 101' around the display area 100', and the plastic balls 103' and the sealant 105' are located in the encapsulation area 101'. In a process of manufacturing the display panel 1', the plastic balls 103' and the sealant 105' are mixed together firstly, and then, the encapsulation area 101' is coated with a mixture of the plastic balls 103' and the sealant 105', and then a curing process, for example, is performed on the sealant, so as to assemble the color filter substrate and the array substrate to form a cell, and the plastic balls 103' are used to keep a cell gap between the color filter substrate and the array substrate. However, since the plastic balls 103' and the sealant 105' are mixed together, and the sealant 105' that is uncured has certain fluidity, distribution of the plastic balls 103' in the sealant 105' is random and has no regularity, specific positions of the plastic balls 103' cannot be accurately controlled by human. Since the plastic balls 103' are mixed in the sealant 105', a phenomenon generally occurs in the display panel 1 that a density of plastic balls 103' in some regions is relatively high, where some plastic balls 103' are gathered together, while a density of plastic balls 103' in other regions is relatively low. In a case where the density of the plastic balls 103' is relatively high, although their supporting force to the array substrate is relatively large, aggregation of a plurality of plastic balls 103' may lead to a phenomenon of stack, which may increase a distance between an edge of the color filter substrate and an edge of the array substrate. For example, referring to FIG. 3B, after some plastic balls 103' are stacked, it may be caused that the distance between the color filter substrate and the array substrate may be $d_1'$ at a side and $d_2'$ at the other side, and $d_1'$ and $d_2'$ are not equal. However, $d_1'$ and $d_2'$ are both greater than a preset value d', thereby causing a supporting height between the edge of the color filter substrate and the edge of the array substrate to increase relative to the preset value d', and resulting in a phenomenon of light leakage or edge mura (i.e., uneven brightness) at an edge of the display panel 1'. In a region where the density of the plastic balls 103' is relatively low, although the supporting height may not be affected, insufficient supporting force between the color filter substrate and the array substrate may be caused, which will affect an overall strength of the display panel 1'. Moreover, in a case where the display panel 1' is subjected to a large force, the plastic balls 103' may slightly move, thereby further aggravating a degree of the light leakage or the edge mura, and affecting a display effect of the display panel 1'. Therefore, in the related art, in a case where the color filter substrate and the array substrate are supported by the plastic balls 103', since the distribution of the plastic balls 103' in the sealant 105' is random, uniformity of the supporting height between the color filter substrate and the array substrate is poor, and a difference in heights at different positions cannot be compensated by the color filter substrate or the array substrate. Due to a difference between the supporting heights, an upper surface and a lower surface of the display panel 1' are not parallel or not approximately parallel to each other, and a quality and the display effect of the display panel 1' are both relatively poor. For example, referring to FIG. 3C, an influence of the plastic balls 103' in the cell gap between the color filter substrate and the array substrate is described by taking an example in which the color filter substrate and the array substrate each include a substrate 102'. Since the plastic balls 103' may cause two substrates 102' not to be parallel or not to be approximately parallel to each other, the upper surface (a surface of the substrate of the color filter substrate away from the plastic balls 103') and the lower surface (a surface of the substrate of the array substrate away from the plastic balls 103') of the display panel 1' are not parallel or not approximately parallel to each other, which is apt to cause phenomena of the light leakage and the edge mura. Moreover, the plastic balls 103' also cause a distance between the two substrates 102 to increase, a part of the plastic balls 103' are not in contact with one or both of the two substrates 102', and cannot play a supporting role, thereby reducing a pressure bearing capacity of the display panel 1' when it is subjected to a force.

However, in the embodiments of the present disclosure, the display substrate 10 includes the spacer layer 103. The spacer layer 103 includes the plurality of first columnar spacers 1031 located in the encapsulation area 101 and distributed at intervals around the display area 100. The bottom ends of the plurality of first columnar spacers 1031 are fixedly disposed on the substrate 102. The positions of the plurality of first columnar spacers 1031 are fixed, and when the display panel 1 is subjected to a force, the positions of the plurality of first columnar spacers 1031 will not change and have no randomness; the heights of the first columnar spacers may be set to be the same or different, and the distances between the bottom ends and/or the top ends of the first columnar spacers and the substrate 102 may also be set to be the same or different, so as to adapt to requirements for assembling different display substrates 10 and opposite substrates 11 to form cells and adapt to cell gaps between different display substrates 10 and opposite substrates 11, thereby ensuring that two opposite surfaces (e.g., the upper surface and the lower surface) of the display panel 1 are parallel or approximately parallel to each other, and avoiding the phenomenon of the light leakage or the edge mura at edges of the display substrate 10 and the opposite substrate 11. Moreover, all of the first columnar spacers 1031 are able to play a supporting role. Therefore, the quality and the display effect of the display panel 1 in the embodiments of the present disclosure are relatively good, and the pressure bearing capacity is relatively strong.

In some embodiments, referring to FIGS. 2B and 2C, distances from the top ends of the plurality of first columnar spacers 1031 to the surface of the substrate 102 away from the plurality of first columnar spacers 1031 are equal or approximately equal.

For example, referring to FIG. 2B, distances between the bottom ends of the plurality of first columnar spacers 1031 and the surface of the substrate 102 away from the plurality of first columnar spacers 1031 are equal or approximately equal, and the heights of the plurality of first columnar spacers 1031 are equal or approximately equal. A manufacturing process of the plurality of first columnar spacers 1031 with such a structure is relatively simple.

For example, referring to FIG. 2C, the distances between the bottom ends of the plurality of first columnar spacers 1031 and the surface of the substrate 102 away from the plurality of first columnar spacers 1031 are not equal, and the heights of the plurality of first columnar spacers 1031 are different, so that the plurality of first columnar spacers 1031 with such a structure may be applicable to substrates 102 with different structures and have a wide application range.

In some embodiments, referring to FIG. 2B, distances from the bottom ends of the plurality of first columnar spacers 1031 to the surface of the substrate 102 away from the plurality of first columnar spacers 1031 are equal or approximately equal, and the heights of the plurality of first columnar spacers 1031 are equal or approximately equal. The plurality of first columnar spacers 1031 with such a structure may be manufactured by using an ordinary mask (i.e., a non-halftone mask), and the manufacturing process thereof is relatively simple and manufacturing costs thereof are relatively low.

In some embodiments, referring to FIGS. 4A to 4E, the spacer layer 103 further includes a plurality of second columnar spacers 1032 located in the display area 100 and distributed at intervals, and bottom ends of the plurality of second columnar spacers 1032 are fixedly disposed on the substrate 102. Ends of the plurality of second columnar spacers 1032 proximate to the substrate 102 are the bottom ends thereof, and ends of the plurality of second columnar spacers 1032 away from the substrate 102 are top ends thereof.

The description of "the bottom ends of the plurality of second columnar spacers 1032 being fixedly disposed on the substrate 102" will be understood that, the bottom ends of the plurality of second columnar spacers 1032 are fixedly disposed on the substrate 102 on which the pattern layer 102' has been manufactured.

Figure 4A:
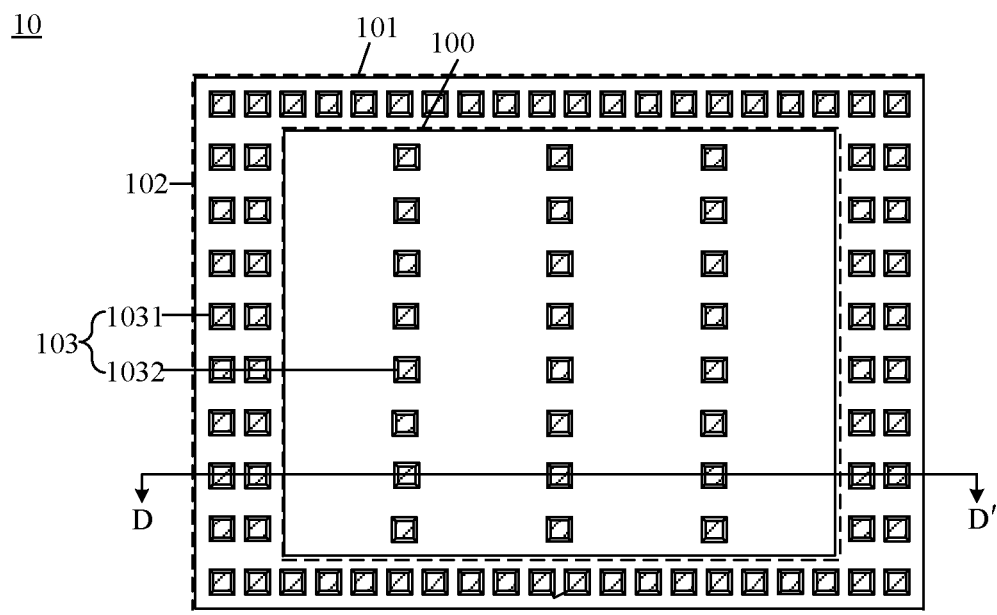
FIG. 4A is a structural diagram of yet another display substrate, in accordance with some embodiments of the present disclosure.
Figure 4B:
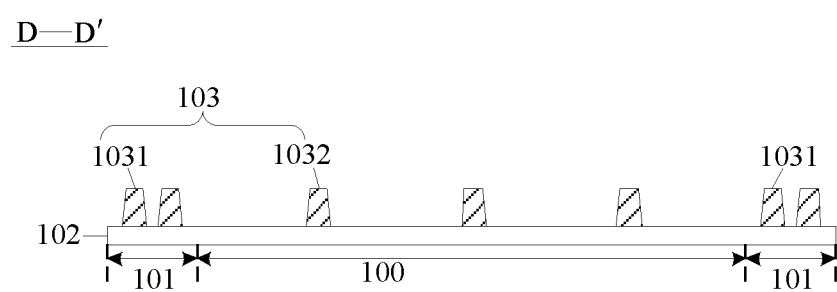
FIGS. 4B to 4E are sectional views of the display substrate in FIG. 4A taken along the line D-D'.
Figure 4C:
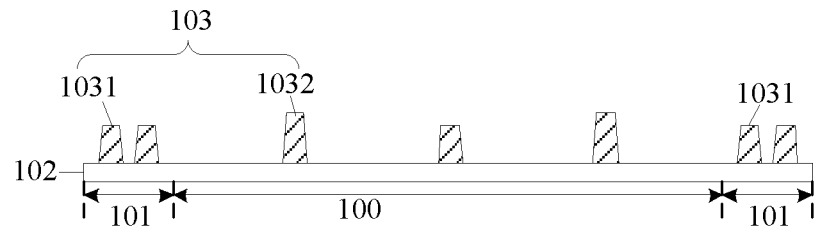

Referring to FIGS. 4B and 4C, distances from the bottom ends of the plurality of second columnar spacers 1032 to the surface of the substrate 102 away from the plurality of second columnar spacers 1032 are equal to or approximately equal to the distances from the bottom ends of the plurality of first columnar spacers 1031 to the surface of the substrate 102 away from the plurality of first columnar spacers 1031. A surface of the substrate 102 proximate to the first columnar spacers 1031 and the second columnar spacers 1032 is relatively flat, which is beneficial to manufacturing the first columnar spacers 1031 and the second columnar spacers 1032 on the substrate 102 and controlling the heights of the first columnar spacers 1031 and heights of the second columnar spacers 1032. The heights of the first columnar spacers 1031 and the heights of the second columnar spacers 1032 may be the same or different.

For example, a structure of the second columnar spacer 1032 is the same as the structure of the first columnar spacer 1031, for example, structures of them are each a frustum of a prism, and longitudinal sections of them are each a trapezoid.

Figure 4D:
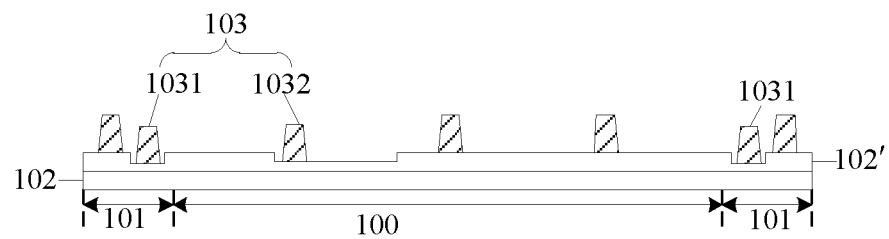

In some other embodiments, referring to FIGS. 4B and 4D, the heights of the plurality of first columnar spacers 1031 are equal to or approximately equal to the heights of the plurality of second columnar spacers 1032. The heights of the plurality of second columnar spacers 1032 and the heights of the plurality of first columnar spacers 1031 are the same, so that the first columnar spacers 1031 and the second columnar spacers 1032 are simultaneously manufactured by using the same ordinary mask.

Figure 4E:
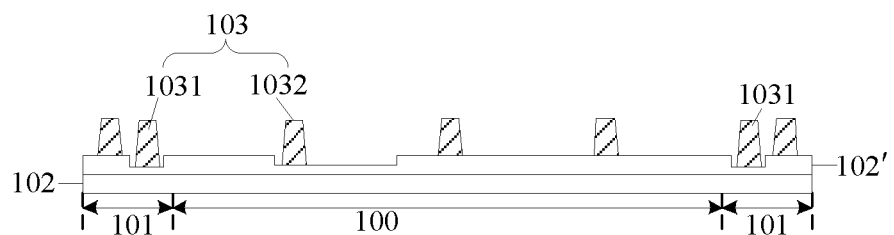

In some other embodiments, referring to FIGS. 4B and 4E, the distances from the top ends of the plurality of first columnar spacers 1031 to the surface of the substrate 102 away from the plurality of first columnar spacers 1031 are equal to or approximately equal to distances from the top ends of the plurality of second columnar spacers 1032 to the surface of the substrate 102 away from the plurality of second columnar spacers 1032.

For example, in the display substrate 10 shown in FIG. 4B, the distances from the bottom ends of the plurality of first columnar spacers 1031 to the surface of the substrate 102 away from the plurality of first columnar spacers 1031 are equal to or approximately equal to the distances from the bottom ends of the plurality of second columnar spacers 1032 to the surface of the substrate 102 away from the plurality of second columnar spacers 1032, and the heights of the plurality of first columnar spacers 1031 are equal to or approximately equal to the heights of the plurality of second columnar spacers 1032. In the display substrate 10 shown in FIG. 4E, the distances from the bottom ends of the plurality of first columnar spacers 1031 to the surface of the substrate 102 away from the plurality of first columnar spacers 1031 are not exactly equal, the distances from the bottom ends of the plurality of second columnar spacers 1032 to the surface of the substrate 102 away from the plurality of second columnar spacers 1032 are not exactly equal, and the distances from the bottom ends of the plurality of first columnar spacers 1031 to the surface of the substrate 102 away from the plurality of first columnar spacers 1031 are not exactly equal to the distances from the bottom ends of the plurality of second columnar spacers 1032 to the surface of the substrate 102 away from the plurality of second columnar spacers 1032; the heights of the plurality of first columnar spacers 1031 are not exactly equal, the heights of the plurality of second columnar spacers 1032 are not exactly equal, and the heights of the plurality of first columnar spacers 1031 are not exactly equal to the heights of the plurality of second columnar spacers 1032.

The top ends of the plurality of first columnar spacers 1031 are flush with the top ends of the plurality of second columnar spacers 1032. Therefore, a requirement for alignment accuracy between the display substrate 10 and the opposite substrate 11 is relatively low, which facilitates assembly of the display substrate 10 and the opposite substrate 11 to form a cell; and furthermore, when the opposite substrate 11 is manufactured, a surface of the opposite substrate 11 proximate to the display substrate 10 can be made into a plane, and the manufacturing process is relatively simple.

Referring to FIGS. 4D and 4E, since there are some recessed regions and/or raised regions on the surface of the pattern layer 102' away from the substrate 102, the distances from the bottom ends of the plurality of first columnar spacers 1031 to the surface of the substrate 102 away from the plurality of first columnar spacers 1031 are not exactly equal, and the distances from the bottom ends of the plurality of second columnar spacers 1032 to the surface of the substrate 102 away from the plurality of second columnar spacers 1032 are not exactly equal. In FIG. 4D, the heights of the first columnar spacers 1031 are equal to or approximately equal to the heights of the second columnar spacers 1032. Although the top ends of the first columnar spacers 1031 are not flush with the top ends of the second columnar spacers 1032, a distance difference therebetween can be compensated by a pattern layer provided in the opposite substrate 11. For example, in a case where there is a recessed region on the pattern layer 102' provided in the display substrate 10, a region of the pattern layer in the opposite substrate 11 overlapping with a projection of the recessed region may be set as a raised region to compensate for the distance difference between the top ends of the first columnar spacers 1031 and the top ends of the second columnar spacers 1032.

In some embodiments, referring to FIGS. 5A to 5G, the display substrate 10 further includes a filter layer 106 located between the plurality of second columnar spacers 1032 and the substrate 102. The filter layer 106 includes a plurality of filter patterns 106' with different colors.

The plurality of filter patterns 106' with different colors are, for example, filter patterns 106' with three primary colors, e.g., red filter patterns 106', green filter patterns 106' and blue filter patterns 106'. The plurality of filter patterns 106' with different colors are used to convert light emitted from the backlight into light with three primary colors. It will be noted that, only four filter patterns 106' that have three colors are illustrated in FIGS. 5A to 5E, but the number of filter patterns 106' is not limited thereby.

A supporting layer 107 further provided in the display substrate 10 is located between the plurality of first columnar spacers 1031 and the substrate 102. The supporting layer 107 includes supporting pattern(s) 107' with at least one color. A material of a supporting pattern 107' with any color of the at least one color is the same as a material of any filter pattern in the plurality of filter patterns 106' with different colors.

Figure 5A:
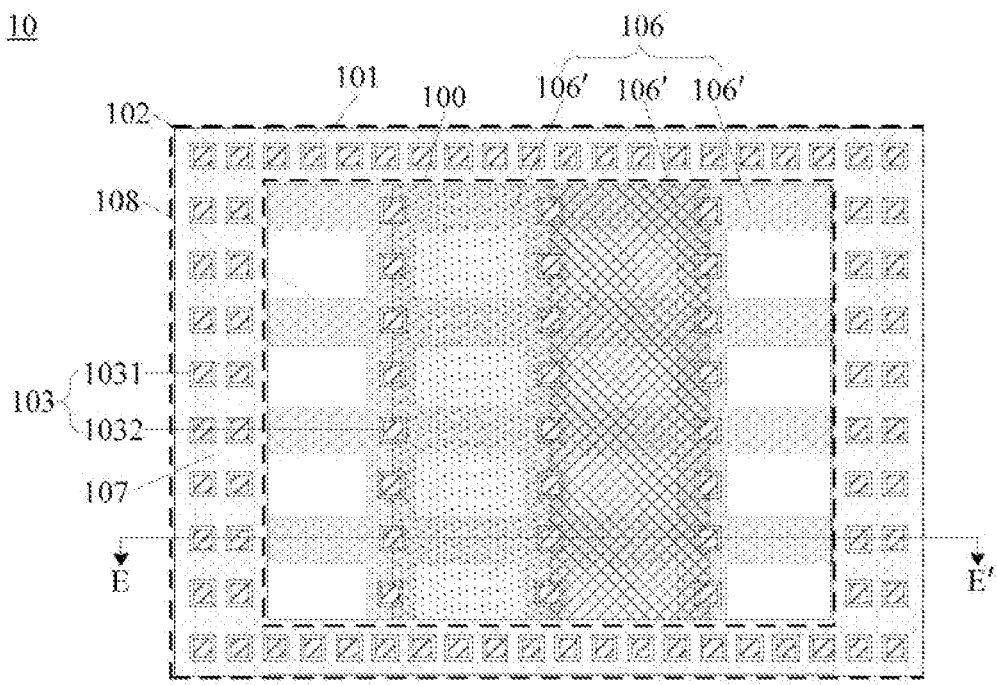
FIG. 5A is a structural diagram of yet another display substrate, in accordance with some embodiments of the present disclosure.
Figure 5B:
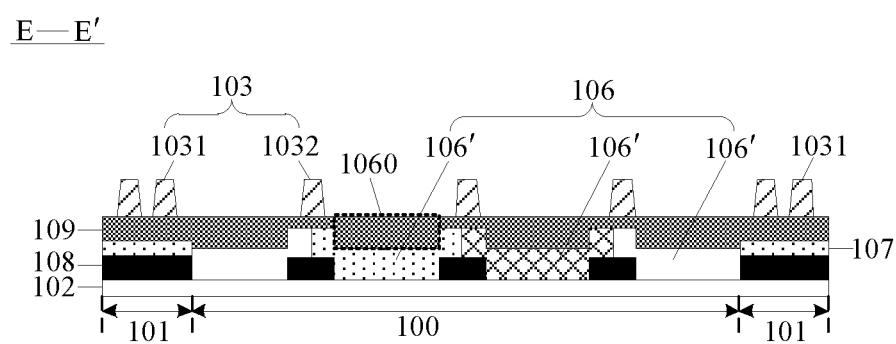
FIG. 5B is a sectional view of the display substrate in FIG. 5A taken along the line E-E'.

For example, referring to FIGS. 5A and 5B, the supporting layer 107 includes one supporting pattern 107', which is square-shaped. There is no hollowed-out region in the supporting pattern 107'. The material of the supporting pattern 107' is the same as the material of any filter pattern 106' in the plurality of filter patterns 106' with different colors. For example, if the material of the supporting pattern 107' is the same as a material of the blue filter pattern 106', a color of the supporting pattern 107' is also blue.

Figure 5C:
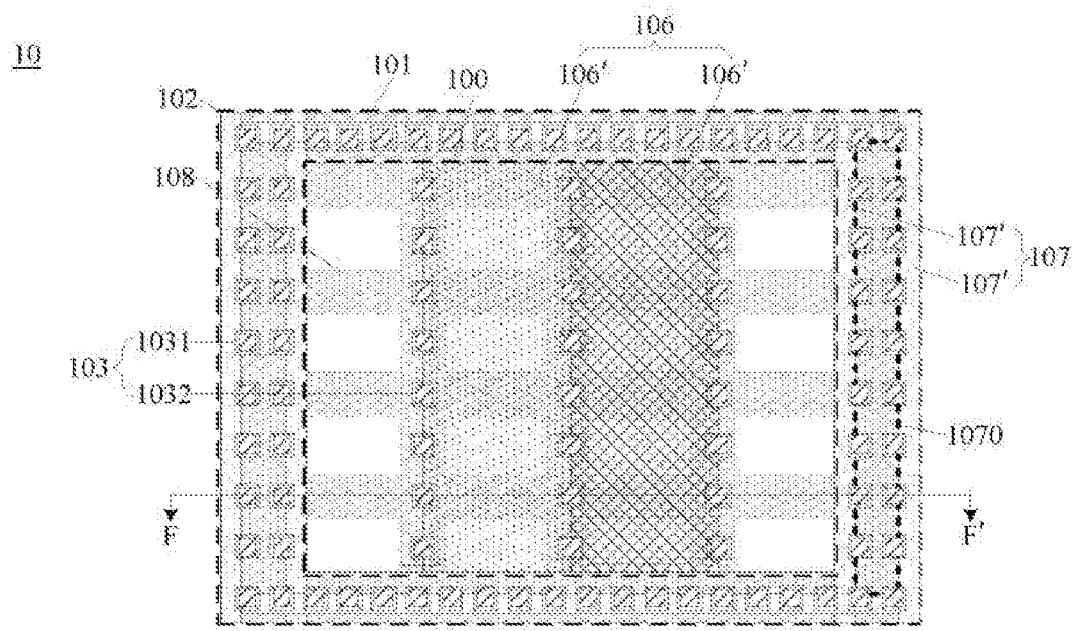
FIG. 5C is a structural diagram of yet another display substrate, in accordance with some embodiments of the present disclosure.
Figure 5D:
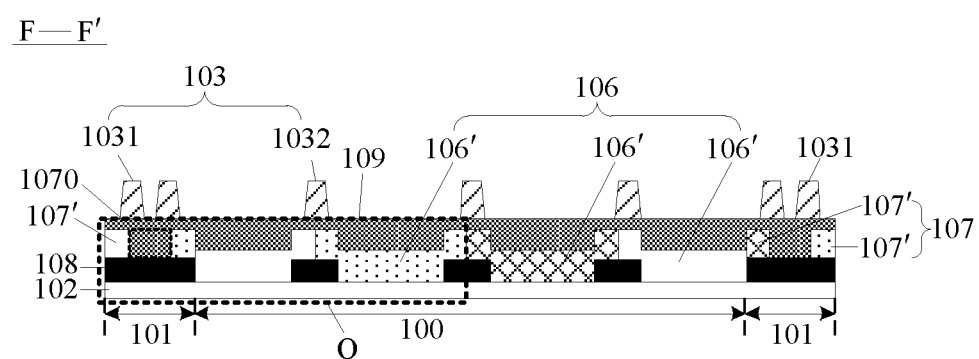
FIG. 5D is a sectional view of the display substrate in FIG. 5C taken along the line F-F'.

For example, referring to FIGS. 5C and 5D, the supporting layer 107 has a plurality of hollowed-out regions 1070. The hollowed-out regions 1070 are used to receive a portion of a protective layer 109.

Referring to FIGS. 5A and 5C, a black matrix layer 108 further provided in the display substrate 10 is located on the substrate 102 and located in the display area 100 and the encapsulation area 101. A portion of the black matrix layer 108 located in the display area 100 is in a shape of a grid, and a portion of the black matrix layer 108 located in the encapsulation area 101 has a planar structure. Projections of the plurality of first columnar spacers 1031 on the substrate 102 and projections of the plurality of second columnar spacers 1032 on the substrate 102 are all located within a projection of the black matrix layer 108 on the substrate 102. That is, positions where the plurality of first columnar spacers 1031 and the plurality of second columnar spacers 1032 are manufactured correspond to the black matrix layer 108, so that the plurality of first columnar spacers 1031 and the plurality of second columnar spacers 1032 may be prevented from blocking light entering the filter patterns 106'.

The portion of the black matrix layer 108 located in the display area 100 is in the shape of the grid, and the filter patterns 106' cover the grid; and the light emitted from the backlight enters the filter patterns 106' through the grid. The portion of the black matrix layer 108 located in the encapsulation area 101 has the planar structure, and is used to prevent the light emitted from the backlight from exiting to result in light leakage at an edge of the display substrate 1.

Referring to FIGS. 5B and 5D, the protective layer 109 further provided in the display substrate 1 is located between the filter layer 106 and the plurality of second columnar spacers 1032, and between the supporting layer 107 and the plurality of first columnar spacers 1031. That is, the protective layer extends from the display area 100 to the encapsulation area 101.

The protective layer 109 is used to protect the filter layer 106 and the supporting layer 107 that are located thereunder. Moreover, a relatively flat surface may be formed on a side of the protective layer 109 away from the substrate 102, and the flat surface facilitates subsequent manufacturing of the plurality of first columnar spacers 1031 and the plurality of second columnar spacers 1032. That is, the protective layer may also play a planarization role.

For example, a material of the protective layer 109 is an overcoat (OC) material, and the OC material is a photosensitive resin material. The protective layer 109 may protect the filter layer 106 and the black matrix layer 108.

It will be understood by a person skilled in the art that the black matrix layer 108, the filter layer 106, the supporting layer 107 and the protective layer 109 herein are a specific structure of the pattern layer 102' described above.

Figure 5E:
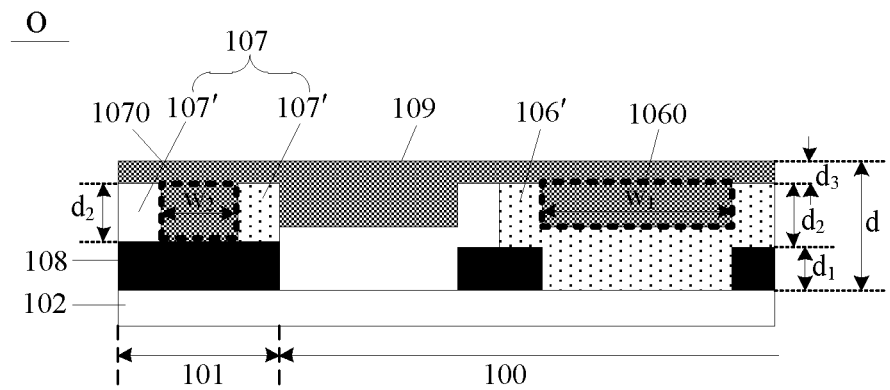
FIG. 5E is an enlarged schematic diagram of part O in FIG. 5D.

Referring to FIGS. 5B and 5E, since a structure of the portion of the black matrix layer 108 located in the display area 100 is different from a structure of the portion of the black matrix layer 108 located in the encapsulation area 101, there is a groove 1060 in a surface of the filter pattern 106' away from the substrate 102, while there is not necessarily a groove 1060 in a surface of the supporting layer 107 away from the substrate 102; in addition, an ability of planarization of the protective layer 109 is limited. Therefore, it is necessary to properly arrange the supporting layer 107 to form a flat surface used during the manufacturing the first columnar spacers 1031 and the second columnar spacers through the effect of planarization of the protective layer 109.

In some embodiments, referring to FIGS. 5A and 5B, the supporting layer 107 includes one supporting pattern 107'. There is no hollowed-out region 1070 in the supporting pattern 107', and a thickness of the supporting pattern 107' is less than a thickness of the filter pattern 106'. Referring to FIG. 5B, during providing the supporting layer 107, a thickness of the supporting layer 107 including one supporting pattern 107' is set to be less than the thickness of the filter pattern 106', so as to achieve planarization by the protective layer 109. Since the supporting layer 107 includes one supporting pattern 107', if the thickness of the supporting layer 107 is set to be equal to the thickness of the filter pattern 106', for a coating process of manufacturing the protective layer 109, the planarization cannot be achieved by the protective layer 109, that is, a flat surface cannot be formed on the side of the protective layer 109 away from the substrate 102. An upper surface of a portion of the protective layer 109 with this structure located in the encapsulation area 101 is higher than an upper surface of a portion of the protective layer 109 located in the display area 100, and the upper surfaces of the portions of the protective layer 109 are a surface of the protective layer 109 away from the substrate 102. Therefore, the thickness of the supporting pattern 107' is less than the thickness of the filter pattern 106'.

In some other embodiments, referring to FIGS. 5C, 5D and 5E, the supporting layer 107 includes a plurality of hollowed-out regions 1070 and a plurality of supporting patterns 107'. Thicknesses of the plurality of supporting patterns 107' are equal to or approximately equal to the thickness of the filter pattern 106'.

Colors of the plurality of supporting patterns 107' may be the same, for example, all of them are blue, and thus the blue supporting patterns 107' and the blue filter patterns 106' may be manufactured simultaneously. Alternatively, the colors of the plurality of supporting patterns 107' may be different, for example, some supporting patterns 107' are red supporting patterns 107', some supporting patterns 107' are blue supporting patterns 107' and some supporting patterns 107' are green supporting patterns 107', and thus the red supporting patterns 107' and the red filter patterns 106' may be manufactured simultaneously, the blue supporting patterns 107' and the blue filter patterns 106' may be manufactured simultaneously, and the green supporting patterns 107' and the green filter patterns 106' may be manufactured simultaneously. That is, a color of a supporting pattern 107' is the same as a color of a filter pattern 106' that has the same material as the supporting pattern 107'.

Referring to FIGS. 5D and 5E, during providing the supporting layer 107, the thickness of the supporting layer 107 including the plurality of supporting patterns 107' is set to be equal to the thickness of the filter pattern 106'. Hollowed-out regions 1070 are provided between the plurality of supporting patterns 107', and a size of the hollowed-out region 1070 is related to a size of the groove 1060. For example, a volume of the hollowed-out region 1070 is equal to or approximately equal to a volume of the groove 1060. For another example, as shown in FIG. 5E, a width $w_1$ of the groove 1060 is greater than 10 microns and less than 100 microns, and a width $w_2$ of the hollowed-out region 1070 is less than or equal to (10 μm±2 μm).

Referring to FIG. 5E, the thickness of the supporting pattern 107' is equal to a thickness $d_2$ of the filter pattern 106'. In this case, in a region of the display area 100 corresponding to the black matrix layer 108, a sum of a thickness $d_1$ of the black matrix layer 108, the thickness $d_2$ of the filter pattern 106' and a thickness $d_3$ of a portion of the protective layer 109 is equal to d; in the encapsulation area 101, a sum of the thickness $d_1$ of the black matrix layer 108, the thickness $d_2$ of the supporting pattern 107' and the thickness $d_3$ of the portion of the protective layer 109 is also equal to d. Therefore, it may be ensured that the surface of the protective layer 109 away from the substrate 102 is a flat surface, which may also be referred to as a horizontal plane.

Figure 5F:
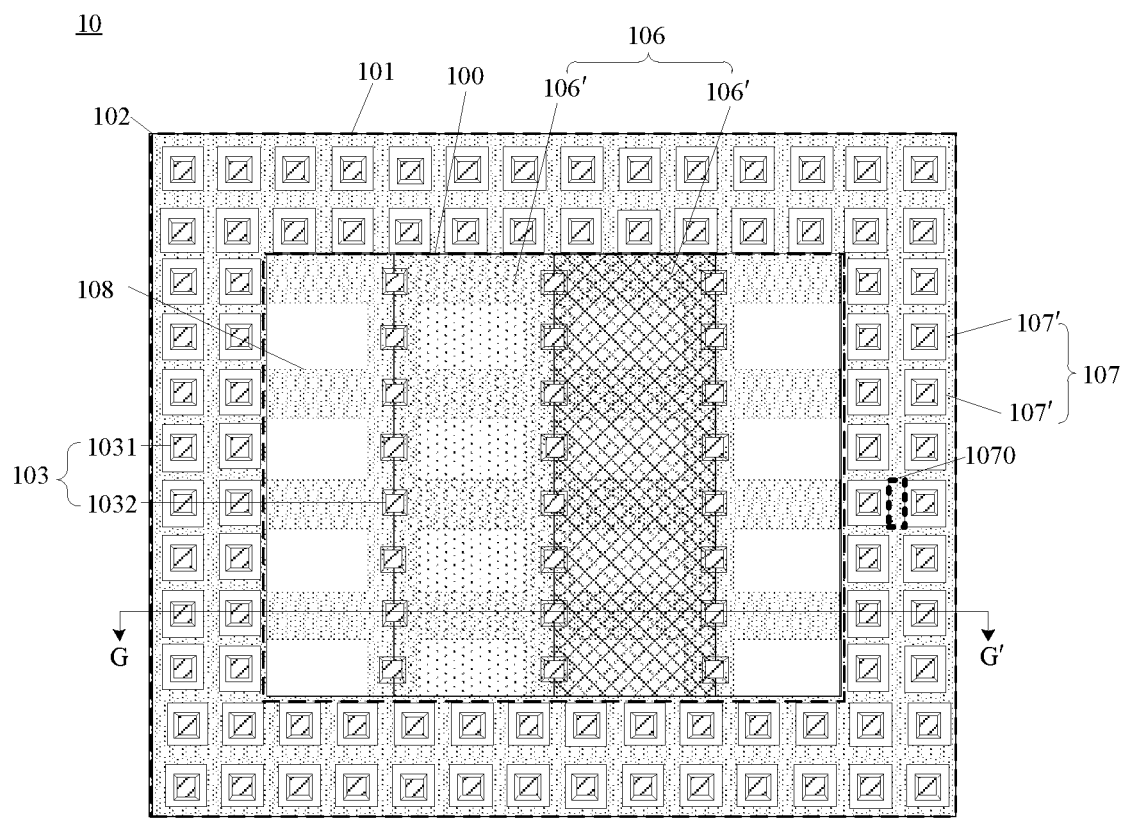
FIG. 5F is a structural diagram of yet another display substrate, in accordance with some embodiments of the present disclosure.
Figure 5G:
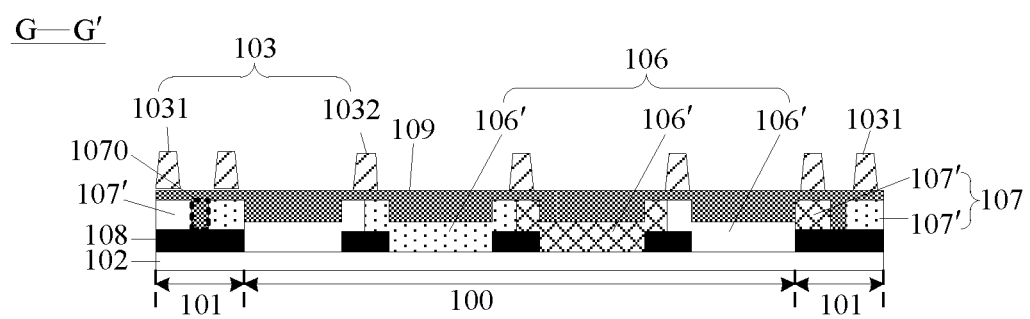
FIG. 5G is a sectional view of the display substrate in FIG. 5F taken along the line G-G'.

In some other embodiments, referring to FIGS. 5F and 5G, a first columnar spacer 1031 corresponds to a supporting pattern 107', a hollowed-out region 1070 exists between two adjacent supporting patterns, and an orthographic projection of the first columnar spacer 1031 on the substrate 102 is located within an orthographic projection of the supporting pattern 107' on the substrate 102. In a case where supporting patterns 107' exists right below first columnar spacers 1031, it may be further ensured that distances between bottom ends of the first columnar spacers 1031 and the substrate 102 are equal.

In some other embodiments, a thickness of any supporting pattern 107' in the plurality of supporting patterns 107' may be greater than the thickness of the filter pattern 106'. In this case, the supporting patterns 107' and the filter patterns 106' may also be manufactured by using the same ordinary mask.

It will be seen from the above that, a relationship between the size of the hollowed-out region 1070 and the size of the groove 1060 determines whether the surface of the protective layer 109 away from the substrate 102 is flat. Therefore, in some other embodiments, the supporting layer 107 may include one supporting pattern 107', the thickness of the supporting pattern 107' is equal to the thickness of the filter patterns 106', and the supporting pattern 107' is provided with a plurality of hollowed-out regions 1070.

Therefore, in the embodiments of the present disclosure, a specific structure and thickness of the supporting layer is set by selecting different structures of the supporting layer 107 and according to the presence or absence of hollowed-out region(s) 1070, so as to ensure the planarization effect of the protective layer 109.

In some embodiments, the colors of the plurality of supporting patterns 107' are the same. That is, the plurality of supporting patterns and the filter patterns 106' that have the same color as the plurality of supporting patterns are manufactured simultaneously. For example, the colors of the plurality of supporting patterns 107' are all blue, that is, the plurality of supporting patterns 107' and the blue filter patterns 106' are manufactured simultaneously. In a case where the colors of the plurality of supporting patterns 107' are the same, it is convenient to manufacture all the supporting patterns 107' once by using the mask, so that the manufacturing of the supporting layer 107 is relatively simple.

In some embodiments, a material of the plurality of first columnar spacers 1031 is the same as a material of the plurality of second columnar spacers 1032. For example, the material of the plurality of first columnar spacers 1031 and the material of the plurality of second columnar spacers are polyacrylic resin or polyester resin.

In some embodiments, a sum of a first distance, a second distance and a third distance of each of the plurality of first columnar spacers 1031 is equal or approximately equal.

A first distance of a first columnar spacer 1031 is a distance between a bottom end thereof and the surface of the substrate 102 of the display substrate 10 away from the first columnar spacer 1031, a second distance of the first columnar spacer 1031 is a distance between the bottom end thereof and a top end thereof, and a third distance of the first columnar spacer 1031 is a distance between the top end thereof and a surface of a substrate 102 of the opposite substrate 11 away from the first columnar spacer 1031.

Figure 6:
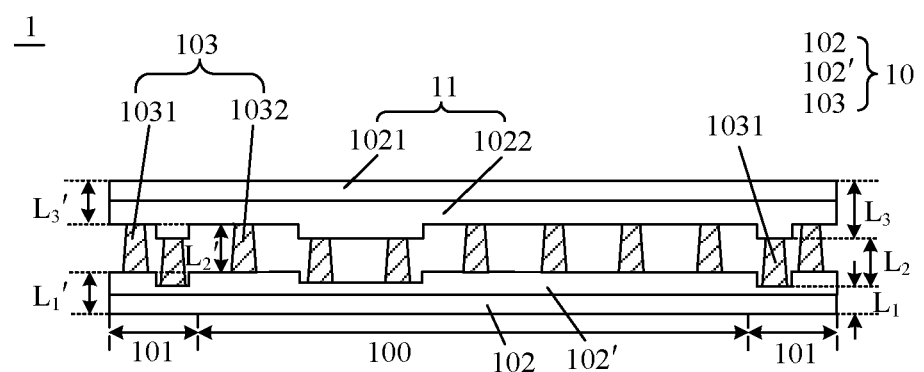
FIG. 6 is a structural diagram of another display panel, in accordance with some embodiments of the present disclosure.

For example, referring to FIG. 6, the display substrate 10 includes the substrate 102 and the pattern layer 102', and the opposite substrate 11 also includes a substrate 1021 and a pattern layer 1022. The first distance of the first columnar spacer 1031 is the distance between the bottom end thereof and the surface of the substrate 102 of the display substrate 10 away from the first columnar spacer 1031, i.e., $L_1$. The second distance of the first columnar spacer 1031 is the distance between the bottom end thereof and the top end thereof, i.e., a height $L_2$ of the first columnar spacer. The third distance of the first columnar spacer 1031 is the distance between the top end thereof and the surface of the substrate 1021 of the opposite substrate 11 away from the first columnar spacer 1031, i.e., $L_3$. The sum of the first distance, the second distance and the third distance of each of the plurality of first columnar spacers 1031 are a sum of $L_1$, $L_2$ and $L_3$.

In a case where the sum of the first distance $L_1$, the second distance $L_2$ and the third distance $L_3$ of each of the plurality of first columnar spacers 1031 is equal or approximately equal, of all the first columnar spacers 1031, the first distances $L_1$ may be completely equal or partially equal, the second distances $L_2$ may be completely equal or partially equal, and the third distances $L_3$ may be completely equal or partially equal.

The sum of the first distance $L_1$, the second distance $L_2$ and the third distance $L_3$ of each of the plurality of first columnar spacers 1031 is equal or approximately equal, which may ensure that the surface of the substrate 102 of the display substrate 10 away from the first columnar spacers 1031 is parallel to or approximately parallel to the surface of the substrate 1021 of the opposite substrate 11 away from the first columnar spacers 1031, thereby avoiding the phenomena of the light leakage or the edge mura on the display panel 1. Moreover, the top ends of the plurality of first columnar spacers 1031 may all be in contact with the opposite substrate 11, so that the supporting force of the first columnar spacers 1031 to the opposite substrate 11 is improved, and the pressure bearing capacity of the display panel 1 when it is subjected to the force is improved.

In some other embodiments, referring to FIG. 6, the sum of the first distance $L_1$, the second distance $L_2$ and the third distance $L_3$ of each of the plurality of first columnar spacers 1031 is equal to or approximately equal to a sum of a first distance $L_1'$, a second distance $L_2'$ and a third distance $L_3'$ of each of the plurality of second columnar spacers 1032. The first distance $L_1'$ of the second columnar spacer 1032 is a distance between a bottom end thereof and the surface of the substrate 102 of the display substrate 10 away from the second columnar spacer 1032, the second distance $L_2'$ of the second columnar spacer 1032 is a distance between the bottom end thereof and a top end thereof, and the third distance $L_3'$ of the second columnar spacer 1032 is a distance between the top end thereof and a surface of the substrate 1021 of the opposite substrate 11 away from the second columnar spacer 1032.

The sum of the first distance $L_1$, the second distance $L_2$ and the third distance $L_3$ of each of the plurality of first columnar spacers 1031 is equal to or approximately equal to the sum of the first distance $L_1'$, the second distance $L_2'$ and the third distance $L_3'$ of each of the plurality of second columnar spacers 1032, which may ensure that an upper surface and a lower surface of the display panel 1 are parallel or approximately parallel to each other, thereby avoiding the phenomena of the light leakage or the edge mura. In addition, top ends of the first columnar spacers 1031 and the second columnar spacers 1032 are all in contact with the opposite substrate 11, and thus the pressure bearing capacity of the display panel 1 when it is subjected to the force may be improved. Furthermore, specific heights of the first columnar spacers 1031 and the second columnar spacers 1032 may be set according to specific structures at different positions of the pattern layer 102', which improves applicability of the first columnar spacers 1031 and the second columnar spacers 1032.

In some embodiments, the dummy pixel area 104 is provided with filter patterns 106' with a plurality of colors, and a portion of the black matrix layer 108 in the shape of the grid. In some other embodiments, the dummy pixel area 104 is provided with a portion of the supporting layer 107, and a portion of the black matrix layer 108 having the planar structure. The dummy pixel area 104 is a transition area between the display area 100 and the encapsulation area 101, and the dummy pixel area 104 is not used for display. Therefore, in the dummy pixel area 104, the filter patterns 106' and the portion of the black matrix layer 108 in the shape of the grid may be provided, or the portion of the supporting layer 107 and the portion of the black matrix layer 108 having the planar structure may be provided. That is, for the dummy pixel area 104, structures of the portion of the filter layer 106, the portion of the supporting layer 107 and the portion of the black matrix layer 108 therein may be the same as the structures of a portion of the filter layer 106, a portion of the supporting layer 107 and a portion of the black matrix layer 108 in the display area, or may be the same as the structures of a portion of the filter layer 106, a portion of the supporting layer 107 and a portion of the black matrix layer 108 in the encapsulation area 101, either of which will not affect normal operation of the display substrate 10.

In some embodiments, the opposite substrate 11 includes a metal layer, the top ends of the first columnar spacers 1031 and the top ends of the second columnar spacers 1032 are in contact with the metal layer, or the projections of the first columnar spacers 1031 on the substrate 102 are located within a projection of the metal layer on the substrate 102. For example, the metal layer is used to form data lines.

In some embodiments, the display substrate 10 is a color filter substrate, and the opposite substrate 11 is an array substrate.

In some other embodiments, the display substrate 10 is an array substrate, and the opposite substrate 11 is a color filter substrate.

Some embodiments of the present disclosure further provides a manufacturing method for a display substrate 10, and the method includes:

forming a first film on a substrate 102, and patterning the first film to form a plurality of first columnar spacers distributed at intervals, the plurality of first columnar spacers 1031 being located in an encapsulation area 101.

The patterning may be achieved, for example, through a patterning process, which includes, for example, coating, exposure, development, etching and so on.

The manufacturing method for the display substrate 10 provided by the embodiments of the present disclosure has the same beneficial effects as the display substrate 10 as described above, and thus the beneficial effects will not be described in detail herein.

In some embodiments, referring to FIGS. 4A to 4E, when the first film is patterned to form the plurality of first columnar spacers 1031, a plurality of second columnar spacers 1032 distributed at intervals are synchronously formed, and the plurality of second columnar spacers 1032 are located in the display area 100.

When the first columnar spacers 1031 and the second columnar spacers 1032 are synchronously manufactured, the same ordinary mask or the same halftone mask may be used, and in this way, the manufacturing process is relatively simple.

It will be noted that the halftone mask is a mask that can manufacture patterns with different thicknesses based on the same film, and the ordinary mask is a mask that can manufacture patterns with the same thickness based on the same film.

Referring to FIGS. 4B and 4C, distances from bottom ends of the plurality of second columnar spacers 1032 to the surface of the substrate 102 away from the plurality of second columnar spacers 1032 are equal to or approximately equal to distances from bottom ends of the plurality of first columnar spacers 1031 to the surface of the substrate 102 away from the plurality of first columnar spacers 1031. A surface of the substrate 102 proximate to the plurality of first columnar spacers 1031 and the plurality of second columnar spacers 1032 is a plane, which facilitates the manufacturing of the plurality of first columnar spacers 1031 and the plurality of second columnar spacers 1032 thereon.

In some other embodiments, referring to FIGS. 4B and 4D, heights of the plurality of first columnar spacers 1031 are equal to or approximately equal to heights of the plurality of second columnar spacers 1032, which facilitates to synchronously manufacture the plurality of first columnar spacers 1031 and the plurality of second columnar spacers 1032 through the same ordinary mask, and in this way, the manufacturing process is simple and the manufacturing costs are relatively low.

In some embodiments, referring to FIGS. 4B and 4E, distances from top ends of the plurality of first columnar spacers 1031 to the surface of the substrate 102 away from the plurality of first columnar spacers 1031 are equal to or approximately equal to distances from top ends of the plurality of second columnar spacers 1032 to the surface of the substrate 102 away from the plurality of second columnar spacers 1032, which facilitates the assembly of the display substrate 10 and the opposite substrate 11 to form a cell.

Referring to FIG. 4E, in a case where the heights of the plurality of first columnar spacers 1031 are different and the heights of the plurality of second columnar spacers 1032 are different, it is necessary to use a halftone mask to manufacture the plurality of first columnar spacers 1031 and the plurality of second columnar spacers 1032, and in this way, the manufacturing process is relatively simple.

In some embodiments, before the first film is formed, the manufacturing method for the display substrate 10 further includes follow steps.

Figure 7A:
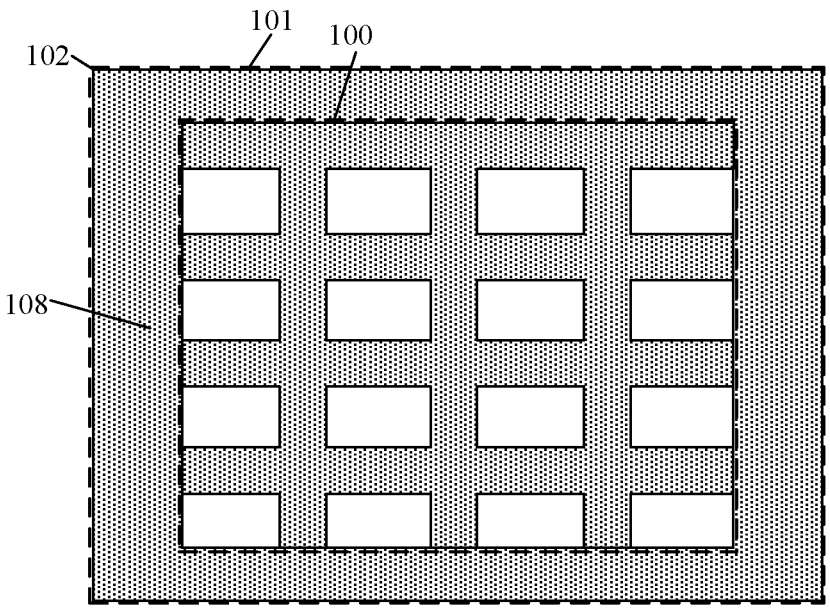
FIGS. 7A to 7G are schematic diagrams showing a process of manufacturing a display substrate, in accordance with some embodiments of the present disclosure.

Referring to FIG. 7A, a third film is formed on a side of the substrate 102, and the third film is patterned to form a black matrix layer 108.

A portion of the black matrix layer 108 located in the display area 100 is in a shape of a grid, and a portion of the black matrix layer 108 located in the encapsulation area 101 has a planar structure.

Figure 7B:
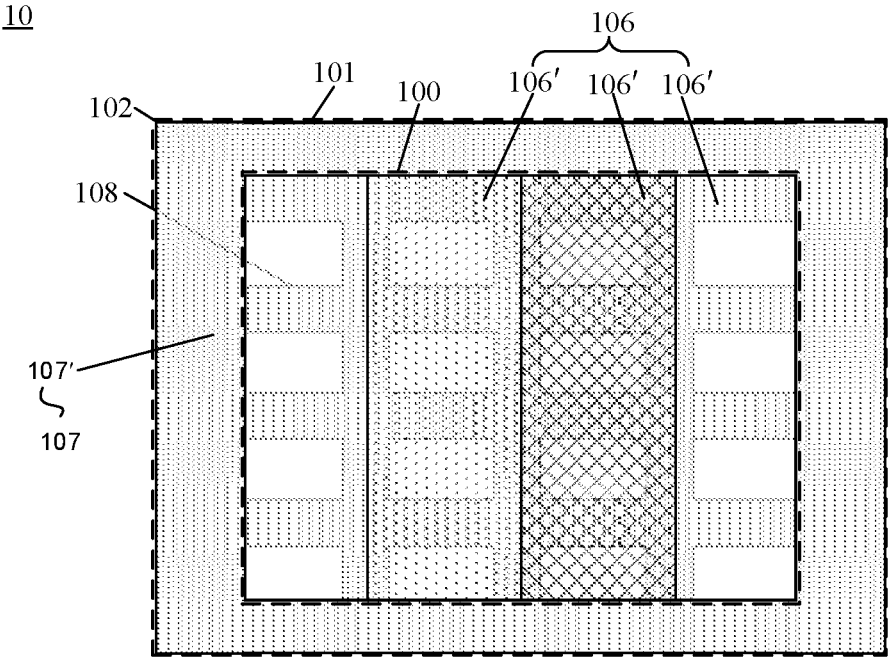

Referring to FIG. 7B, a second film is formed on the substrate 102 on which the black matrix layer 108 has been formed, and then the second film is patterned to form a filter layer 106 and a supporting layer 107. The filter layer 106 includes filter patterns 106' with a plurality of colors, the supporting layer 107 includes supporting pattern(s) 107' with at least one color, and a material of a supporting pattern 107' with any color of the at least one color is the same as a material of any filter pattern 106' in filter patterns 106' with different colors.

Figure 7C:
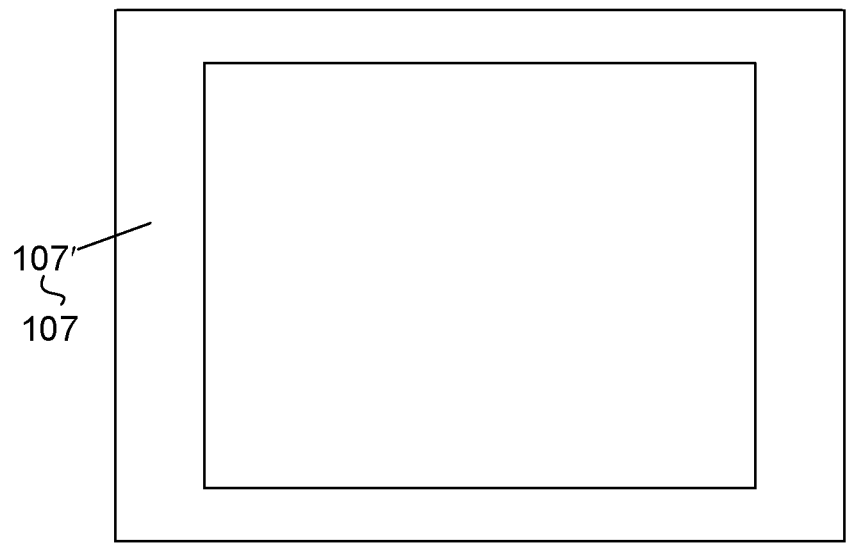

For example, referring to FIGS. 7B and 7C, the supporting layer 107 includes one supporting pattern 107', which is square-shaped. A thickness of the supporting pattern 107' is less than a thickness of the filter pattern 106'. The supporting pattern 107' and the filter patterns 106' with this structure may be manufactured by using the same halftone mask.

For another example, referring to FIGS. 7D to 7G, the supporting layer 107 includes a plurality of supporting patterns 107' and has a plurality of hollowed-out regions 1070. In the supporting layer 107, it is only necessary to ensure that thicknesses of the supporting layer 107 can meet requirements of the planarization of the protective layer 109. That is, the thickness of the supporting layer 107 may be less than, equal to or greater than the thickness of the filter pattern 106'. The number and the shape of the plurality of supporting patterns 107' are not limited in the present disclosure.

Figure 7D:
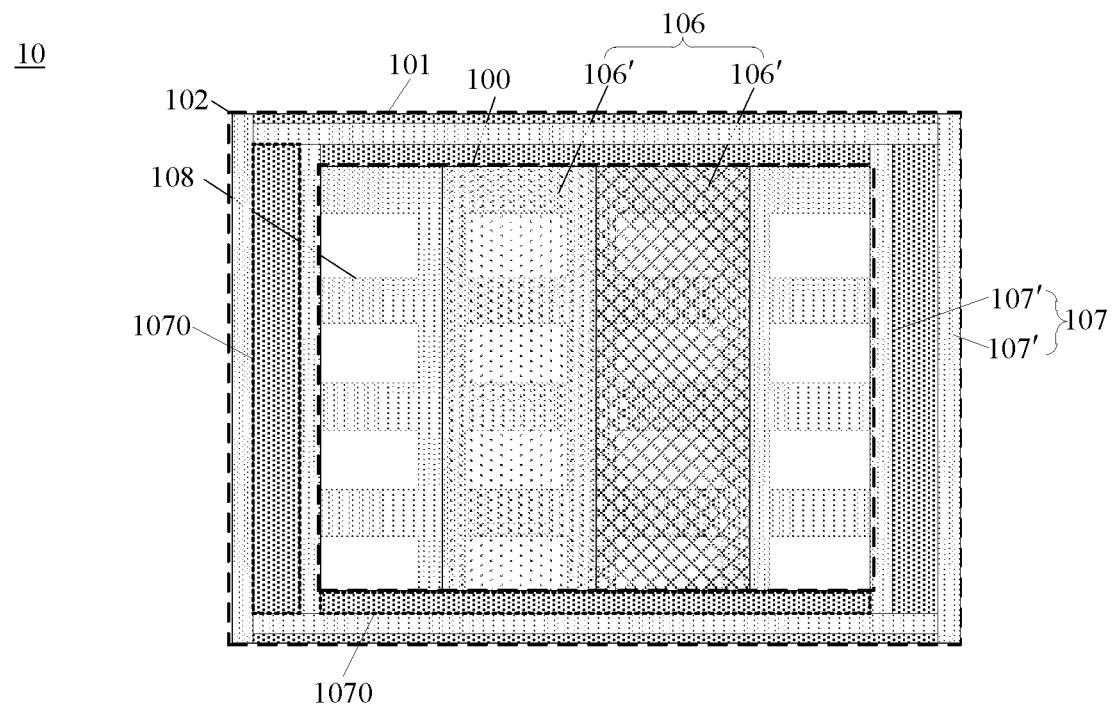
Figure 7E:
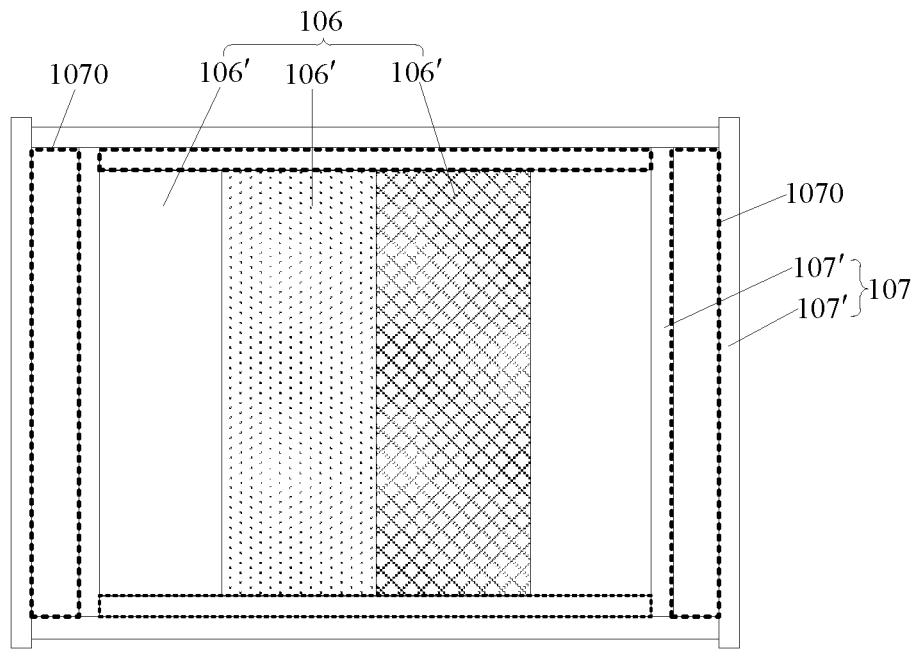
Figure 7F:
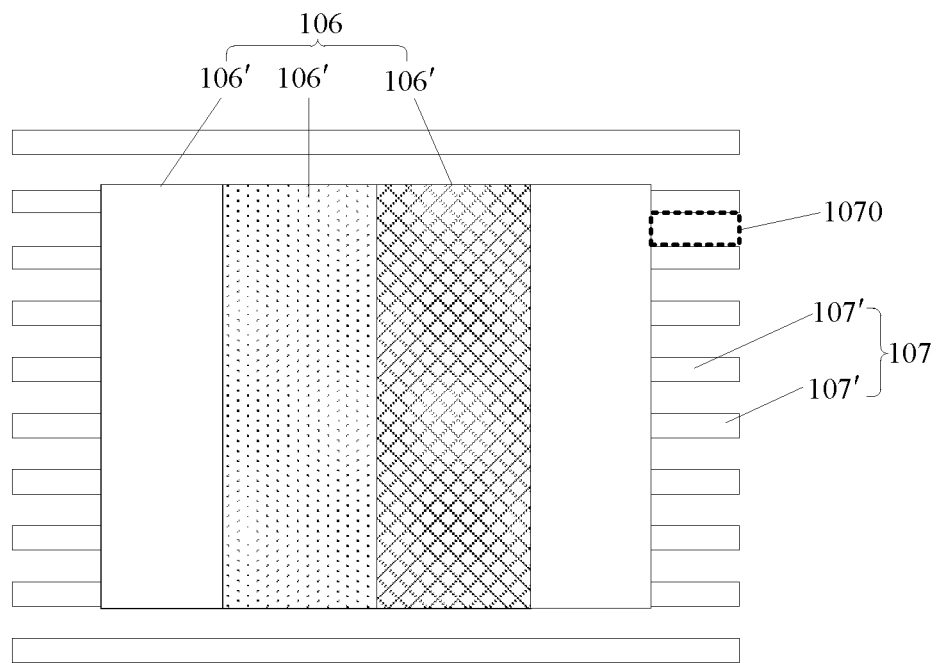
Figure 7G:
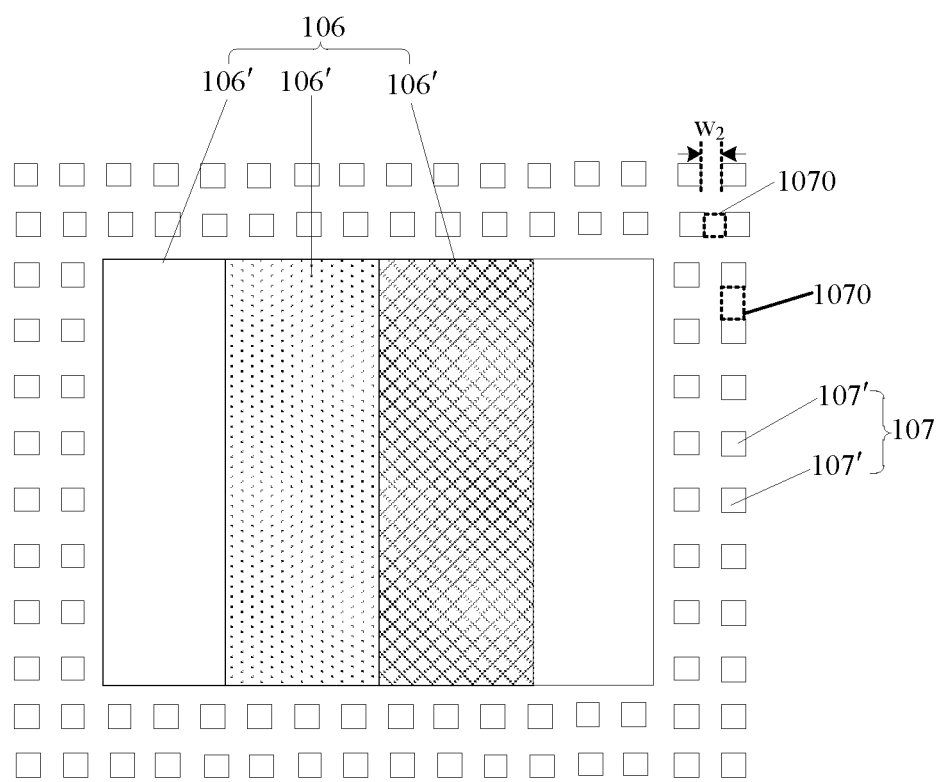

For example, referring to FIG. 7G, the plurality of supporting patterns 107' are distributed in an array, and a shape of a top view of each supporting pattern 107' is rectangular. There is a hollowed-out region 1070 between two adjacent supporting patterns 107', and a width $w_2$ of the hollowed-out region 1070 is 10 μm.

Colors of the plurality of supporting patterns 107' may be the same or different. It will be noted that in a case where the colors of the plurality of supporting patterns 107' are the same, the supporting layer 107 may be regarded as including only one supporting pattern 107' and the plurality of hollowed-out regions 1070, and the thickness of the supporting pattern 107' is equal to the thickness of the filter pattern 106'.

It will be noted that, there is only one supporting pattern 107' on each side of the filter pattern 106' in a width direction of the filter pattern 106', and there are only two supporting patterns 107' on each side of the filter pattern 106' in a length direction of the filter pattern 106'. The number of supporting patterns 107' on each side of the filter pattern 106' is merely illustrative in FIGS. 7D to 7F.

In some embodiments, referring to FIGS. 5D and 5E, the thicknesses of the plurality of supporting patterns 107' are equal to or approximately equal to the thicknesses of the filter patterns 106', and thus the plurality of supporting patterns 107' and the filter patterns 106' may be manufactured simultaneously by using the same ordinary mask.

In some embodiments, referring to FIGS. 7D and 7E, the colors of the plurality of supporting patterns 107' are the same. That is, the plurality of supporting patterns 107' are made of a material of the filter patterns 106' that have the same color as the plurality of supporting patterns 107', for example, all of them are blue, thereby facilitating the manufacturing of the plurality of supporting patterns 107' once.

The foregoing descriptions are merely specific implementations of the present disclosure, but the protection scope of the present disclosure is not limited thereto. Changes or replacements that any person skilled in the art could conceive of within the technical scope of the present disclosure shall be included in the protection scope of the present disclosure. Therefore, the protection scope of the present disclosure shall be subject to the protection scope of the claims.

What is claimed is:

1. A display substrate having a display area and an encapsulation area around the display area, the display substrate comprising:
   a substrate;
   a spacer layer located on a side of the substrate, wherein the spacer layer includes:
      a plurality of first columnar spacers located in the encapsulation area and distributed at intervals around the display area, bottom ends of the plurality of first columnar spacers being fixedly disposed on the substrate, wherein ends of the plurality of first columnar spacers proximate to the substrate are the bottom ends thereof, and ends of the plurality of first columnar spacers away from the substrate are top ends thereof; a shape of a structure of a first columnar spacer of the plurality of first columnar spacers is a frustum of a cone or a frustum of a prism; a shape of a longitudinal section of the first columnar spacer is a trapezoid; and a length of a bottom base of the trapezoid is greater than a length of a top base of the trapezoid, the bottom base of the trapezoid being located on a side proximate to the substrate; and
      a plurality of second columnar spacers located in the display area and distributed at intervals, bottom ends of the plurality of second columnar spacers being fixedly disposed on the substrate, wherein ends of the plurality of second columnar spacers proximate to the substrate are the bottom ends thereof, and ends of the plurality of second columnar spacers away from the substrate are top ends thereof;
   a filter layer located between the plurality of second columnar spacers and the substrate, the filter layer including a plurality of filter patterns with different colors; and
   a supporting layer located between the plurality of first columnar spacers and the substrate, the supporting layer including at least one supporting pattern with at least one color, wherein a material of a supporting pattern with any color of the at least one color is the same as a material of any filter pattern in the plurality of filter patterns with different colors,
   wherein distances from the top ends of the plurality of first columnar spacers to a surface of the substrate away from the plurality of first columnar spacers are approximately equal to distances from the top ends of the plurality of second columnar spacers to a surface of the substrate away from the plurality of second columnar spacers; or
   wherein distances from the bottom ends of the plurality of second columnar spacers to the surface of the substrate away from the plurality of second columnar spacers are approximately equal to distances from the bottom ends of the plurality of first columnar spacers to the surface of the substrate away from the plurality of first columnar spacers, and/or heights of the plurality of first columnar spacers are approximately equal to heights of the plurality of second columnar spacers;
   wherein the at least one supporting pattern includes a plurality of supporting patterns the plurality of supporting patterns are disposed within a same side of the encapsulation area in a direction from the display area to the encapsulation area, and each supporting pattern corresponds to at least one first columnar spacer of the plurality of first columnar spacers;
   the supporting layer has a plurality of hollowed-out regions, and a hollowed-out region exists between two adjacent supporting patterns in the direction from the display area to the encapsulation area; and
   thicknesses of the plurality of supporting patterns are approximately equal to a thickness of the filter pattern.

2. The display substrate according to claim 1, wherein distances from the top ends of the plurality of first columnar spacers to the surface of the substrate away from the plurality of first columnar spacers are approximately equal.

3. The display substrate according to claim 1, wherein distances from the bottom ends of the plurality of first columnar spacers to the surface of the substrate away from the plurality of first columnar spacers are approximately equal, and heights of the plurality of first columnar spacers are approximately equal.

4. The display substrate according to claim 1, wherein colors of the plurality of supporting patterns are the same.

5. The display substrate according to claim 1, further comprising: a black matrix layer located on the substrate, projections of the plurality of first columnar spacers on the substrate and projections of the plurality of second columnar spacers on the substrate being all located within a projection of the black matrix layer on the substrate.

6. The display substrate according to claim 1, wherein a material of the plurality of first columnar spacers is the same as a material of the plurality of second columnar spacers.

7. A display device, comprising the display substrate according to claim 1.

8. The display substrate according to claim 1, wherein the distances from the bottom ends of the plurality of first columnar spacers to the surface of the substrate away from the plurality of first columnar spacers are not equal, and the heights of the plurality of first columnar spacers are not equal.

9. A manufacturing method for a display substrate, wherein the display substrate has a display area and an encapsulation area around the display area; and
   the manufacturing method for the display substrate comprises:
   forming a first film on a substrate; and
   patterning the first film to form a plurality of first columnar spacers distributed at intervals, wherein the plurality of first columnar spacers are located in the encapsulation area, wherein a plurality of second columnar spacers distributed at intervals are synchronously formed when the first film is patterned to form the plurality of first columnar spacers, the plurality of second columnar spacers are located in the display area; a shape of a structure of a first columnar spacer of the plurality of first columnar spacers is a frustum of a cone or a frustum of a prism; a shape of a longitudinal section of the first columnar spacer is a trapezoid; and a length of a bottom base of the trapezoid is greater than a length of a top base of the trapezoid, the bottom base of the trapezoid being located on a side proximate to the substrate;

wherein before forming the first film, the manufacturing method for the display substrate further comprises:

forming a second film on a side of the substrate; and patterning the second film to form a filter layer and a supporting layer; the filter layer including filter patterns with a plurality of colors, the supporting layer including at least one supporting pattern with at least one color, and a material of a supporting pattern with any color of the at least one color being the same as a material of any filter pattern in filter patterns with different colors;

wherein distances from top ends of the plurality of first columnar spacers to a surface of the substrate away from the plurality of first columnar spacers are approximately equal to distances from top ends of the plurality of second columnar spacers to a surface of the substrate away from the plurality of second columnar spacers, wherein ends of the plurality of first columnar spacers away from the substrate are the top ends thereof, and ends of the plurality of second columnar spacers away from the substrate are the top ends thereof; or wherein distances from bottom ends of the plurality of second columnar spacers to the surface of the substrate away from the plurality of second columnar spacers are approximately equal to distances from bottom ends of the plurality of first columnar spacers to the surface of the substrate away from the plurality of first columnar spacers, and/or heights of the plurality of first columnar spacers are approximately equal to heights of the plurality of second columnar spacers, wherein ends of the plurality of first columnar spacers proximate to the substrate are the bottom ends thereof, and ends of the plurality of second columnar spacers proximate to the substrate are the bottom ends thereof;

wherein the at least one supporting pattern includes a plurality of supporting patterns, the plurality of supporting patterns are disposed within a same side of the encapsulation area in a direction from the display area to the encapsulation area, and each supporting pattern corresponds to at least one first columnar spacer of the plurality of first columnar spacers;

when the second film is patterned to form the filter layer and the supporting layer, the formed supporting layer has a plurality of hollowed-out regions, and a hollowed-out region exists between two adjacent supporting patterns in the direction from the display area to the encapsulation area; and thicknesses of the plurality of supporting patterns are approximately equal to a thickness of the filter pattern.

10. The manufacturing method for the display substrate according to claim 9, wherein colors of the plurality of supporting patterns included in the formed supporting layer are the same.

* * * * *